United States Patent
Horton

(10) Patent No.: US 9,919,422 B1
(45) Date of Patent: Mar. 20, 2018

(54) METHODS AND SYSTEMS TO PROVIDE MECHANICAL FEEDBACK DURING MOVEMENT OF A ROBOTIC SYSTEM

(71) Applicant: X Development LLC, Mountain View, CA (US)

(72) Inventor: Adam Edward Horton, Oakland, CA (US)

(73) Assignee: X Development LLC, Mountain View, CA (US)

( * ) Notice: Subject to any disclaimer, the term of this patent is extended or adjusted under 35 U.S.C. 154(b) by 39 days.

(21) Appl. No.: 14/989,026

(22) Filed: Jan. 6, 2016

(51) Int. Cl.
    *B25J 9/16* (2006.01)
(52) U.S. Cl.
    CPC ............ *B25J 9/1633* (2013.01); *Y10S 901/14* (2013.01); *Y10S 901/49* (2013.01)
(58) Field of Classification Search
    None
    See application file for complete search history.

(56) References Cited

U.S. PATENT DOCUMENTS

| | | |
|---|---|---|
| 4,641,251 A | 2/1987 | Inoue |
| 4,761,595 A | 8/1988 | Goor |
| 4,791,588 A | 12/1988 | Onda |
| 5,056,038 A | 10/1991 | Kuno et al. |
| 5,153,409 A | 10/1992 | Rudaitis |
| 5,691,898 A | 11/1997 | Rosenberg |
| 6,212,443 B1 | 4/2001 | Nagata |
| 6,385,508 B1 | 5/2002 | McGee |
| 7,881,824 B2 | 2/2011 | Nagasaka |
| 7,952,483 B2 | 5/2011 | Ferguson |
| 8,761,926 B2 | 6/2014 | Zaier |

(Continued)

FOREIGN PATENT DOCUMENTS

WO 2011153569 A1 12/2011

OTHER PUBLICATIONS

Rozo et al., Robot Learning from Demonstration in the Force Domain; http://www.iri.upc.edu/files/scidoc/1235-Robot-Learning-From-Demonstration-in-the-Force-Domain.pdf, 2011, 6 pages, CSIC-UPC, Barcelona, ES.

(Continued)

*Primary Examiner* — Ryan Rink
(74) *Attorney, Agent, or Firm* — McDonnell Boehnen Hulbert & Berghoff LLP

(57) ABSTRACT

Example implementations may relate to methods and systems to prevent damage in robots. In particular, a robotic system may include a particular component that is moveable along one or more degrees of freedom (DOFs) each providing a respective range of motion (ROM) of the particular component. This robotic system may detect movement of the particular component along a particular DOF and may responsively determine mechanical feedback characteristics that define, for each of one or more positions of the particular component along the respective ROM provided by the particular DOF, a force to be provided by at least one actuator coupled to the particular component. So during the movement, the robotic system may determine a particular position of the particular component along the respective ROM and, based on the particular position, the robotic system may direct an actuator to provide a force in accordance with the determined mechanical feedback characteristics.

20 Claims, 15 Drawing Sheets

(56) References Cited

U.S. PATENT DOCUMENTS

| | | |
|---|---|---|
| 9,186,795 B1 | 11/2015 | Edsinger et al. |
| 9,221,117 B2 | 12/2015 | Conrardy et al. |
| 9,566,125 B2 * | 2/2017 | Bowling .................. B25J 13/00 |
| 9,586,323 B2 | 3/2017 | Diolaiti |
| 2003/0025473 A1 | 2/2003 | Nagata |
| 2003/0144764 A1 | 7/2003 | Yokono |
| 2004/0254771 A1 | 12/2004 | Reiner et al. |
| 2005/0004734 A1 | 1/2005 | Cripps |
| 2005/0222714 A1 | 10/2005 | Nihei |
| 2006/0261770 A1 * | 11/2006 | Kishi .................... B25J 3/04 |
| | | 318/568.11 |
| 2006/0293617 A1 | 12/2006 | Einav |
| 2007/0067678 A1 | 3/2007 | Hosek et al. |
| 2007/0120512 A1 * | 5/2007 | Albu-Schaffer ....... B25J 9/1633 |
| | | 318/568.2 |
| 2007/0152619 A1 | 7/2007 | Sugiyama et al. |
| 2007/0282228 A1 | 12/2007 | Einav |
| 2010/0152896 A1 | 6/2010 | Komatsu |
| 2010/0286822 A1 | 11/2010 | Zaier |
| 2010/0312392 A1 | 12/2010 | Zimmerman |
| 2011/0093120 A1 | 4/2011 | Ando et al. |
| 2011/0106311 A1 | 5/2011 | Nakajima |
| 2011/0208355 A1 | 8/2011 | Tsusaka |
| 2011/0301756 A1 | 12/2011 | Yoshiike et al. |
| 2012/0143371 A1 | 6/2012 | Seines |
| 2012/0239193 A1 | 9/2012 | Mizutani |
| 2013/0116706 A1 | 5/2013 | Lee et al. |
| 2013/0178980 A1 | 7/2013 | Chemouny et al. |
| 2013/0226346 A1 | 8/2013 | Dreslinski |
| 2013/0310977 A1 | 11/2013 | Tsusaka |
| 2013/0343640 A1 | 12/2013 | Buehler |
| 2013/0345873 A1 | 12/2013 | Blumberg |
| 2014/0039521 A1 * | 2/2014 | Mohr .................... B25J 9/1689 |
| | | 606/130 |
| 2014/0201571 A1 | 7/2014 | Hosek et al. |
| 2014/0277725 A1 | 9/2014 | Kouno |
| 2014/0320629 A1 | 10/2014 | Chizeck et al. |
| 2015/0025684 A1 | 1/2015 | Negishi |
| 2015/0088309 A1 | 3/2015 | Doll et al. |
| 2015/0105907 A1 | 4/2015 | Aiso |
| 2015/0120055 A1 | 4/2015 | Miyazawa et al. |
| 2015/0127151 A1 | 5/2015 | Riedel et al. |
| 2015/0217445 A1 * | 8/2015 | Hietmann ............. B25J 9/0081 |
| | | 700/264 |
| 2015/0250547 A1 | 9/2015 | Fukushima et al. |
| 2015/0258679 A1 | 9/2015 | Izhikevich |
| 2015/0258682 A1 | 9/2015 | Izhikevich |
| 2015/0258683 A1 | 9/2015 | Izhikevich |
| 2015/0342695 A1 | 12/2015 | He et al. |
| 2016/0016314 A1 * | 1/2016 | Hietmann ............. B25J 9/1674 |
| | | 700/245 |
| 2016/0089788 A1 * | 3/2016 | Nammoto ............. B25J 9/1633 |
| | | 700/250 |
| 2016/0367334 A1 * | 12/2016 | Devengenzo .......... A61B 90/50 |
| 2017/0014998 A1 * | 1/2017 | Langenfeld ........... B25J 9/1638 |
| 2017/0112580 A1 * | 4/2017 | Griffiths ................ A61B 90/50 |

OTHER PUBLICATIONS

Pending U.S. Appl. No. 14/570,183, filed Dec. 15, 2014.

* cited by examiner

MECHANICAL FEEDBACK
CHARACTERISTICS 802

| POSITION | FORCE |
|---|---|
| α | 0 N·m |
| β | 1 N·m |
| λ | 4 N·m |
| δ | 6 N·m |
| γ | 9 N·m |

Figure 8A

MECHANICAL FEEDBACK
CHARACTERISTICS 804

| POSITION | FORCE |
|---|---|
| α | 10 N·m |
| β | 8 N·m |
| λ | 5 N·m |
| δ | 4 N·m |
| γ | 2 N·m |

Figure 8B

METHODS AND SYSTEMS TO PROVIDE MECHANICAL FEEDBACK DURING MOVEMENT OF A ROBOTIC SYSTEM

BACKGROUND

Robotic systems may be used for applications involving material handling, welding, assembly, and dispensing, among others. Over time, the manner in which these robotic systems operate is becoming more intelligent, more efficient, and more intuitive. As robotic systems become increasingly prevalent in numerous aspects of modern life, the need for robotic systems capable of working alongside humans becomes apparent. Therefore, a demand for such robotic systems has helped open up a field of innovation in actuators, sensing techniques, as well as component design and assembly.

SUMMARY

Example implementations may relate to a robotic system that includes features that may help prevent damage to this robotic system. In particular, the robotic system may be arranged to detect movement of a particular component along a particular degree of freedom (DOF) and to responsively determine mechanical feedback characteristics associated with the particular DOF. These mechanical feedback characteristics may define forces that should be applied (e.g., by at least one actuator coupled to the particular component) at various respective positions of the particular component along the respective range of motion (ROM) provided by the particular DOF. So at any given point in time, the robotic system may determine a particular position of the particular component along this respective ROM and, based on the particular position, the robotic system could direct an actuator to apply a force in accordance with the mechanical feedback characteristics associated with the particular DOF.

In one aspect, a method is described. The method involves detecting, by a robotic system including a particular component that is moveable along one or more degrees of freedom (DOFs) each providing a respective range of motion (ROM) of the particular component, movement of the particular component along a particular degree of freedom (DOF) of the one or more DOFs. The method also involves, in response to detecting the movement, the robotic system determining mechanical feedback characteristics that define, for each of one or more positions of the particular component along the respective ROM provided by the particular DOF, a force to be provided by at least one actuator coupled to the particular component. The method additionally involves, during the movement, the robotic system determining a particular position of the particular component along the respective ROM provided by the particular DOF. The method further involves, based on the determined particular position of the particular component along the respective ROM provided by the particular DOF, the robotic system directing at least one actuator to provide a force in accordance with the determined mechanical feedback characteristics.

In another aspect, a non-transitory computer readable medium is described. The non-transitory computer readable medium has stored therein instructions executable by one or more processors to cause a robotic system to perform functions, the robotic system including a particular component that is moveable along one or more degrees of freedom (DOFs) each providing a respective range of motion (ROM) of the particular component. The functions include detecting movement of the particular component along a particular degree of freedom (DOF) of the one or more DOFs. The functions also include, in response to detecting the movement, determining mechanical feedback characteristics that define, for each of one or more positions of the particular component along the respective ROM provided by the particular DOF, a force to be provided by at least one actuator coupled to the particular component. The functions additionally include, during the movement, determining a particular position of the particular component along the respective ROM provided by the particular DOF. The functions further include, based on the determined particular position of the particular component along the respective ROM provided by the particular DOF, directing at least one actuator to provide a force in accordance with the determined mechanical feedback characteristics.

In yet another aspect, a robotic system is described. The robotic system includes a particular component that is moveable along one or more degrees of freedom (DOFs) each providing a respective range of motion (ROM) of the particular component. The robotic system also includes, one or more processors, a non-transitory computer readable medium, and program instructions stored on the non-transitory computer readable medium and executable by the one or more processors to detect movement of the particular component along a particular degree of freedom (DOF) of the one or more DOFs. The program instructions are also executable to, in response to detecting the movement, determine mechanical feedback characteristics that define, for each of one or more positions of the particular component along the respective ROM provided by the particular DOF, a force to be provided by at least one actuator coupled to the particular component. The program instructions are additionally executable to, during the movement, determine a particular position of the particular component along the respective ROM provided by the particular DOF. The program instructions are further executable to, based on the determined particular position of the particular component along the respective ROM provided by the particular DOF, direct at least one actuator to provide a force in accordance with the determined mechanical feedback characteristics.

In yet another aspect, another system is described. The system may include means for detecting movement of a particular component along a particular degree of freedom (DOF). The system may also include means for, in response to detecting the movement, determining mechanical feedback characteristics that define, for each of one or more positions of the particular component along a respective ROM provided by the particular DOF, a force to be provided by at least one actuator coupled to the particular component. The system may additionally include means for, during the movement, determining a particular position of the particular component along the respective ROM provided by the particular DOF. The system may further include means for, based on the determined particular position of the particular component along the respective ROM provided by the particular DOF, directing at least one actuator to provide a force in accordance with the determined mechanical feedback characteristics.

These as well as other aspects, advantages, and alternatives will become apparent to those of ordinary skill in the art by reading the following detailed description, with reference where appropriate to the accompanying drawings.

BRIEF DESCRIPTION OF THE DRAWINGS

FIG. 8A to 8B illustrate mechanical feedback characteristics, according to an example implementation.

DETAILED DESCRIPTION

Figure 1:
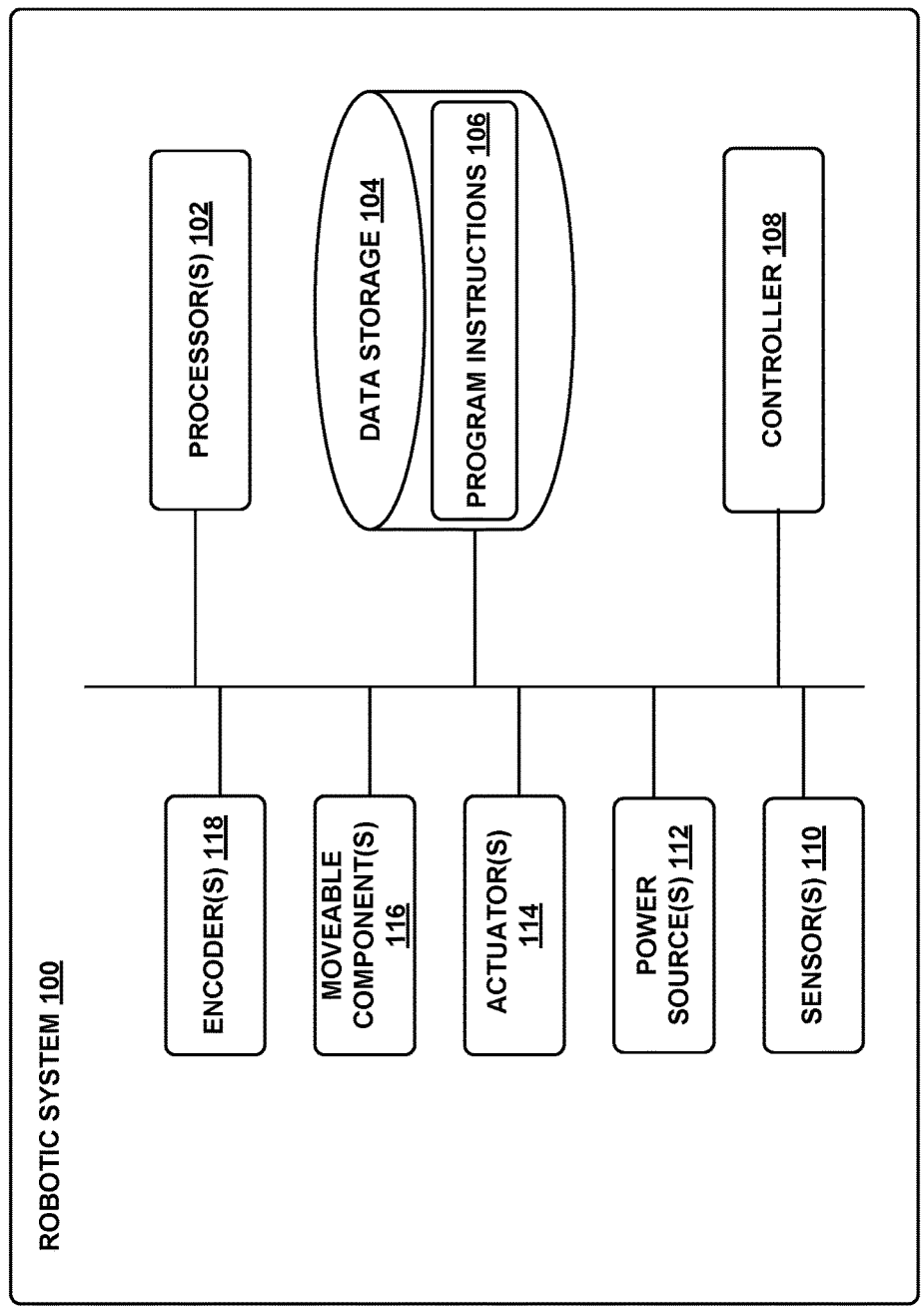
FIG. 1 illustrates a configuration of a robotic system, according to an example implementation.

Example methods and systems are described herein. It should be understood that the words "example," "exemplary," and "illustrative" are used herein to mean "serving as an example, instance, or illustration." Any implementation or feature described herein as being an "example," being "exemplary," or being "illustrative" is not necessarily to be construed as preferred or advantageous over other implementations or features. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

I. OVERVIEW

In practice, a user of a robotic system may control movement of a certain component of the robotic system, so as to teach the robotic system to carry out a certain task and/or to assist the robotic system to carry out a certain task, among other possibilities. To control the movement, the user may apply external forces to the component and/or may control movement of the component by way of a remote controller that is in communication with the robotic system, among other options. In some situations, however, the user may be unaware of physical limitations of the robotic system and could thus move component(s) of the robotic system beyond these physical limitations, thereby potentially causing damage to the robotic system.

According to various implementations, described herein are methods and systems to help prevent damage to a robotic system by providing feedback to a user of the robotic system. This feedback may specifically involve application of certain forces that could be felt by user(s) and may thus ultimately encourage certain types of movement and/or discourage other types of movement. For instance, such forces may discourage movement of a particular component towards a range of motion (ROM) limit of the particular component, which may define a position beyond which movement of the particular component can potentially cause damage to the robotic system. So to discourage such movement toward the ROM limit, the robotic system may be set to apply a force counteracting movement of the particular component toward the ROM limit, such as at a time when the particular component is positioned substantially close the ROM limit for example.

To determine the specific forces that should be applied, the robotic system may refer to mechanical feedback characteristics that are stored on a data storage of the robotic system or otherwise accessible to the robotic system in other ways. In particular, the robotic system may be arranged to detect movement of a particular component along a particular DOF (e.g., resulting from application of an external force) and then determine mechanical feedback characteristics associated with this particular DOF. These mechanical feedback characteristics may define various forces that should be respectively applied at various positions of the particular component along the respective ROM provided by the particular DOF. So as the particular component moves along the particular DOF, the robotic system could determine a particular position of the particular component and, based on the particular position, may then apply a force in accordance with the mechanical feedback characteristics associated with this particular DOF. In this manner, the robotic system may dynamically provide feedback that could ultimately help prevent damage to the robotic system.

II. EXAMPLE ROBOTIC SYSTEM

Referring now to the figures, FIG. 1 shows an example configuration of a robotic system 100. The robotic system 100 may be a robotic arm, a humanoid robot, or a quadrupedal robot, among other examples. Additionally, the robotic system 100 may also be referred to as a robotic device, robotic manipulator, or robot, among others.

The robotic system 100 is shown to include processor(s) 102, data storage 104, program instructions 106, controller 108, sensor(s) 110, power source(s) 112, actuator(s) 114, moveable component(s) 116, and encoder(s) 118. Note that the robotic system 100 is shown for illustration purposes only as robotic system 100 may include additional components and/or have one or more components removed without departing from the scope of the invention. Further, note that the various components of robotic system 100 may be connected in any manner.

Processor(s) 102 may be a general-purpose processor or a special purpose processor (e.g., digital signal processors, application specific integrated circuits, etc.). The processor(s) 102 can be configured to execute computer-readable program instructions 106 that are stored in the data storage 104 and are executable to provide the functionality of the robotic system 100 described herein. For instance, the program instructions 106 may be executable to provide functionality of controller 108, where the controller 108 may be configured to instruct an actuator 114 to cause movement of one or more moveable component(s) 116.

The data storage 104 may include or take the form of one or more computer-readable storage media that can be read or accessed by processor(s) 102. The one or more computer-readable storage media can include volatile and/or non-volatile storage components, such as optical, magnetic, organic or other memory or disc storage, which can be integrated in whole or in part with processor(s) 102. In some implementations, the data storage 104 can be implemented using a single physical device (e.g., one optical, magnetic, organic or other memory or disc storage unit), while in other implementations, the data storage 104 can be implemented using two or more physical devices. Further, in addition to the computer-readable program instructions 106, the data storage 104 may include additional data such as diagnostic data, among other possibilities.

The robotic system 100 may include one or more sensor(s) 110 such as force sensors, proximity sensors, motion sensors, load sensors, position sensors, touch sensors, depth sensors, ultrasonic range sensors, and infrared sensors, among other possibilities. The sensor(s) 110 may provide sensor data to the processor(s) 102 to allow for appropriate interaction of the robotic system 100 with the environment. Additionally, the sensor data may be used in evaluation of various factors for providing feedback as further discussed below. Further, the robotic system 100 may also include one or more power source(s) 112 configured to supply power to various components of the robotic system 100. Any type of power source may be used such as, for example, a gasoline engine or a battery.

The robotic system 100 may also include one or more actuator(s) 114. An actuator is a mechanism that may be used to introduce mechanical motion. In particular, an actuator may be configured to convert stored energy into movement of one or more components. Various mechanisms may be used to power an actuator. For instance, actuators may be powered by chemicals, compressed air, or electricity, among other possibilities. In some cases, an actuator may be a rotary actuator that may be used in systems involving rotational forms of motion (e.g., a joint in the robotic system 100). In other cases, an actuator may be a linear actuator that may be used in systems involving straight line motion.

In either case, actuator(s) 114 may cause movement of various moveable component(s) 116 of the robotic system 100. The moveable component(s) 116 may include appendages such as robotic arms, legs, and/or hands, among others. The moveable component(s) 116 may also include a moveable base, wheels, and/or end effectors, among others.

Furthermore, the robotic system 100 is shown to include encoder(s) 118, which may each be configured to convert a position to a representative analog or digital signal. In particular, the encoder(s) 118 may include rotary encoder(s) and/or linear encoder(s) that may respectively provide information related to rotary position (and/or rotary movement) of moveable component(s) 116 and/or information related to linear position (and/or linear movement) of moveable component(s) 116, among other possibilities. Moreover, the encoder(s) 118 may take the form of absolute encoder(s) and/or incremental encoder(s), among others. So in an example implementation, as an actuator 114 causes rotation of a moveable component 116 about a joint, a rotary encoder may be used to measure this rotation. In doing so, the rotary encoder may be used to convert a rotary position to an analog or digital electronic signal used by an on-board computing system to determine the amount of rotation from a fixed reference angle and/or to an analog or digital electronic signal that is representative of anew rotary position, among other options. Other examples are also possible.

In some implementations, a computing system (not shown) may be coupled to the robotic system 100 and may be configured to receive input from a user, such as via a graphical user interface. This computing system may be incorporated within the robotic system 100 or may be an external computing system that is capable of (wired or wireless) communication with the robotic system 100. As such, the robotic system 100 may receive information and instructions, such as based on user-input at the graphical user interface and/or based on user-input received via press of buttons (or tactile input) on the robotic system 100, among other possibilities.

Figure 2:
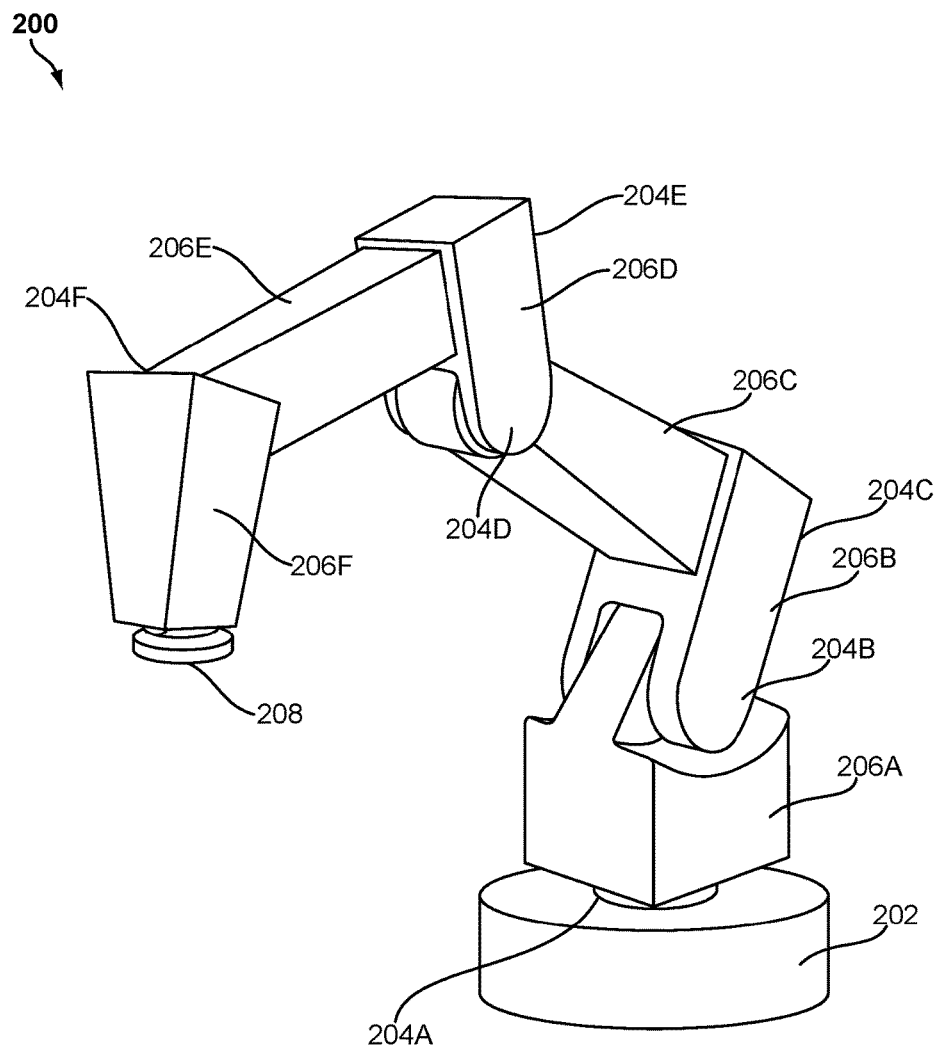
FIG. 2 illustrates a robotic arm, according to an example implementation.

A robotic system 100 may take on various forms. To illustrate, refer to FIG. 2 showing an example robotic arm 200. As shown, the robotic arm 200 includes a base 202, which may be a stationary base or may be a moveable base. In the case of a moveable base, the base 202 may be considered as one of the moveable component(s) 116 and may include wheels (not shown), powered by one or more of the actuator(s) 114, which allow for mobility of the entire robotic arm 200.

Additionally, the robotic arm 200 includes joints 204A-204F each coupled to one or more of the actuator(s) 114. The actuators in joints 204A-204F may operate to cause movement of various moveable component(s) 116 such as appendages 206A-206F and/or end effector 208. For example, the actuator in joint 204F may cause movement of appendage 206F and end effector 208 (i.e., since end effector 208 is coupled to appendage 206F). Further, end effector 208 may take on various forms and may include various parts. In one example, end effector 208 may take the form of a gripper such as a finger gripper or a suction gripper. In another example, end effector 208 may take the form of a tool such as a drill or a brush. In yet another example, the end effector may include sensors such as force sensors, location sensors, and/or proximity sensors. Other examples may also be possible.

III. EXAMPLE USER-ROBOT INTERACTION

In practice, a user of a robotic system 100 may interact with the robotic system 100 in various ways so as to at least partially control operations and/or movements of the robotic system 100. Such interaction may be part of a teach mode of the robotic system, may be part of a gravity compensation mode of the robotic system, and/or may be part of a collaborative mode of the robotic system, among others. These modes are discussed in more detail below.

Figure 3A:
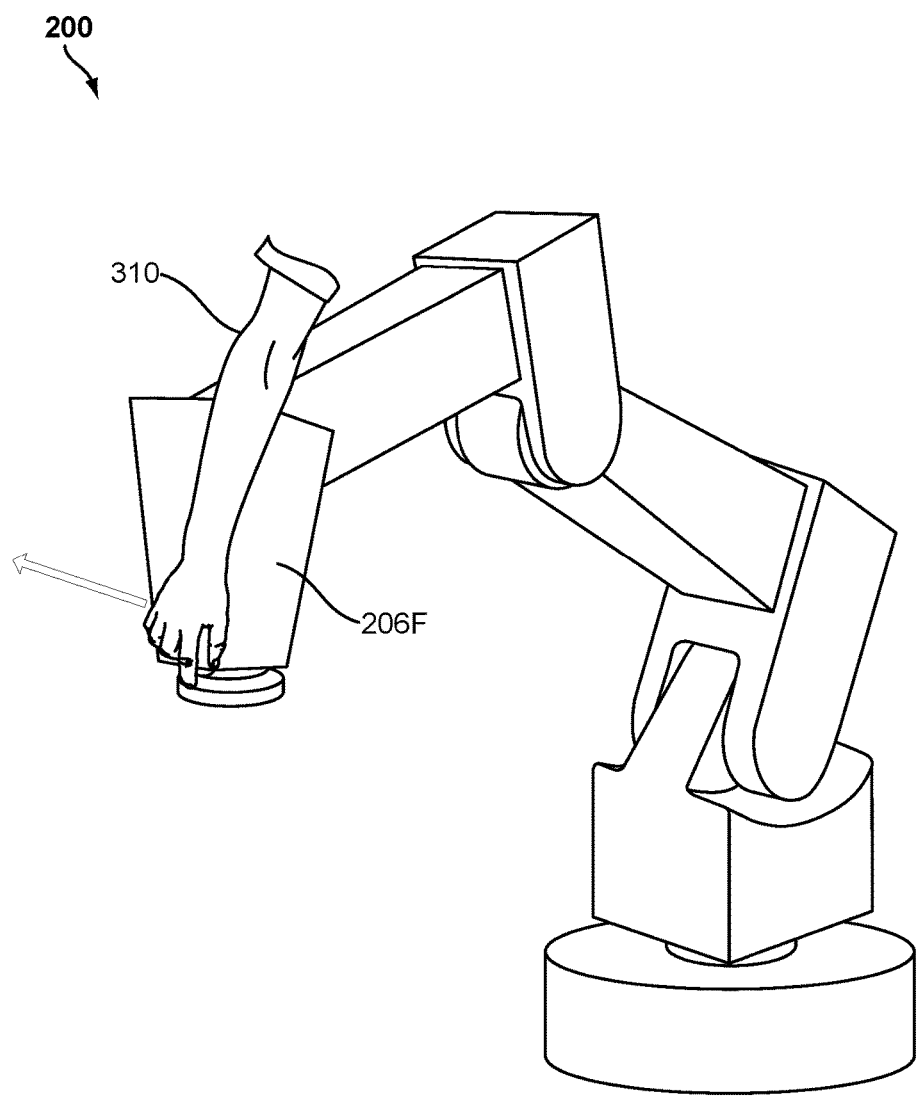
FIG. 3A to 3B respectively illustrate operation of the robotic arm during teach and collaborative modes, according to an example implementation.

In a teach mode, an external force may be applied (e.g., by the user) to the robotic system 100 based on a teaching input that is intended to teach the robotic system 100 regarding how to carry out a specific task. For instance, as shown in FIG. 3A, teach mode may be an operating mode of the robotic arm 200 that allows a user 310 (shown as a human arm for illustration purposes only) to physically interact with and guide the robotic arm 200 towards carrying out and recording various movements, such as movement of appendage 206F for example. The robotic arm 200 may thus obtain data and record regarding how to carry out the specific task based on instructions and guidance from the user 310. Such data may relate to a plurality of configurations of the moveable component(s) 116, joint position data, velocity data, acceleration data, torque data, force data, and/or power data, among other possibilities.

By way of example, during teach mode the user 310 may grasp onto any part of the robotic arm 200 and provide an external force by physically moving the robotic arm 200. In particular, the user 310 may guide the robotic arm 200 towards grasping onto an object and then moving the object from a first location to a second location. As the user 310 guides the robotic arm 200 during teach mode, the system may obtain and record data related to the movement such that the robotic arm 200 may be configured to independently carry out the task at a future time during independent operation (e.g., when the robotic arm 200 operates independently outside of teach mode). Other examples are also possible.

In a gravity compensation mode, the robotic system 100 may maintain a certain configuration (e.g., hold a steady position) until the user applies an external force. In this mode, however, the robotic system 100 may not necessarily record the various movements resulting from the user's external force. Rather, the external force may result in movement of the robotic system 100 that repositions the robotic system from an initial configuration to another configuration. As an example, the robotic arm 200 may have a video camera attached thereon and the robotic arm 200 may hold a first steady position so that video is recordable from a first viewpoint. In this example, the user 310 may guide the robotic arm 200 towards a second position, which the robotic arm 200 may steady to allow for video recording from a second viewpoint. Other examples are also possible.

Figure 3B:
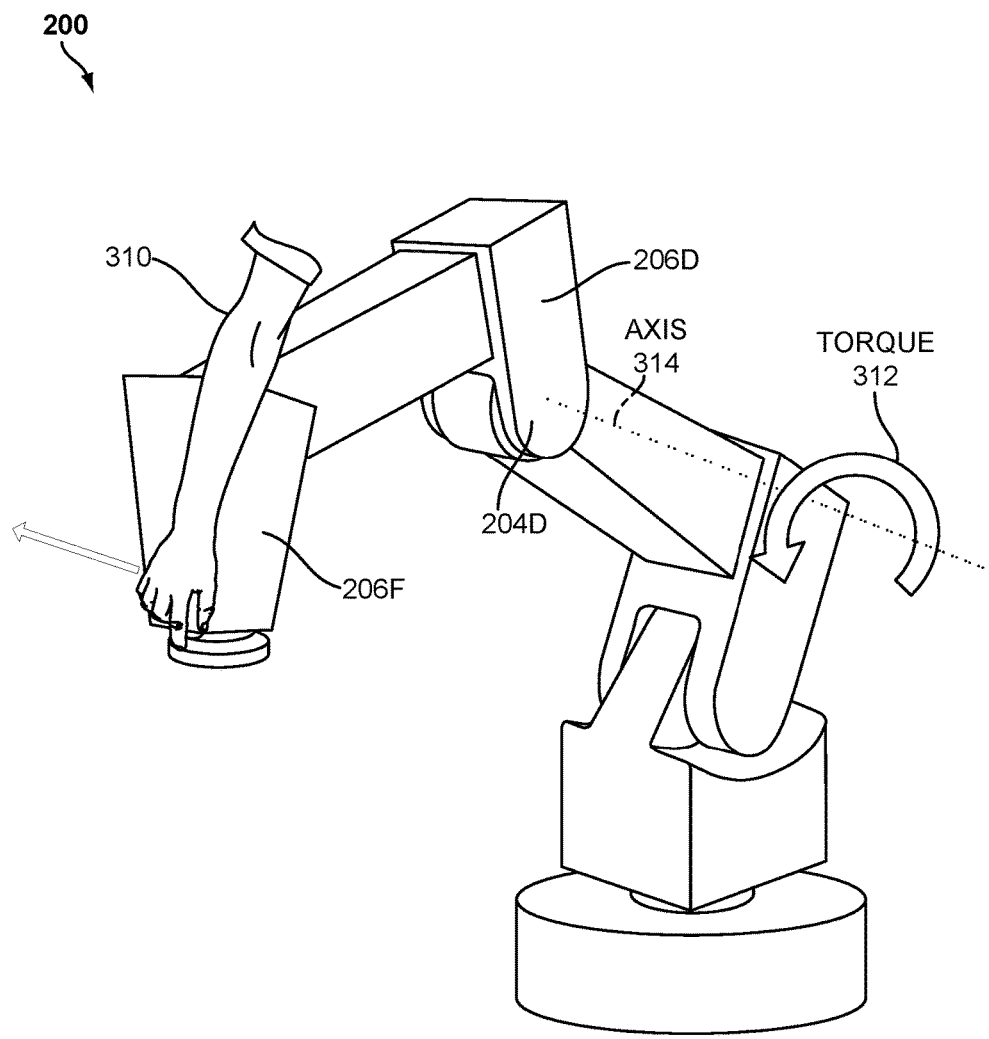

In a collaborative mode, the robotic system 100 may carry out operations, such as movement of one or more of the appendages 206A-206F. And while doing so, an external force may be applied (e.g., by the user) to the robotic system 100 so as to help the robotic system 100 carry out additional operations, such as to assist with movement of one or more appendages that the robotic system 100 is not independently moving and/or to assist with movement of one or more of the appendages that the robotic system 100 is independently moving, among others. For example, as shown in FIG. 3B, the robotic arm 200 independently applies a torque 312 about axis 314 to cause rotation of appendage 206D about joint 204D. And while doing so, user 310 applies an external force to guide the robotic arm 200 towards carrying out movement of appendage 206F in a certain direction as shown. Other examples are possible as well.

In further aspects, the above-mentioned external forces are not limited to being applied by a user. In particular, such external forces may additionally or alternatively be applied by other entities in the physical workspace, such as by other objects, machines, and/or robotic systems, among other possibilities. Furthermore, in either of the above-discussed modes, movement (and/or other operations) of the robotic system 100 may result from other forms of user-robot interaction other than the above-mentioned external forces, and such other forms could be applied in addition to or instead of the external forces applied to the robotic system 100. For example, a remote controller may wirelessly communicate commands to the robotic system 100 to cause movement of one or more appendages. These commands may be based on the user's interaction with the remote controller, such as based on the user's application of an external force to a certain button on the remote controller for instance. Other examples are possible as well.

IV. EXAMPLE FEEDBACK DURING USER-ROBOT INTERACTION

Disclosed herein are example implementations for the robotic system 100 to provide feedback to a user during user-robot interaction, such as during any of the modes described above. This feedback may specify various physical limitations of the robotic system 100. As such, the feedback can be used to encourage certain types of movements of the moveable component(s) 106 while discouraging other types movements of the moveable component(s) 106, such as movements exceeding physical limitations of the robotic system 100. To illustrate, consider FIG. 4 showing an example method for providing feedback to help prevent damage to a robotic system.

Figure 4:
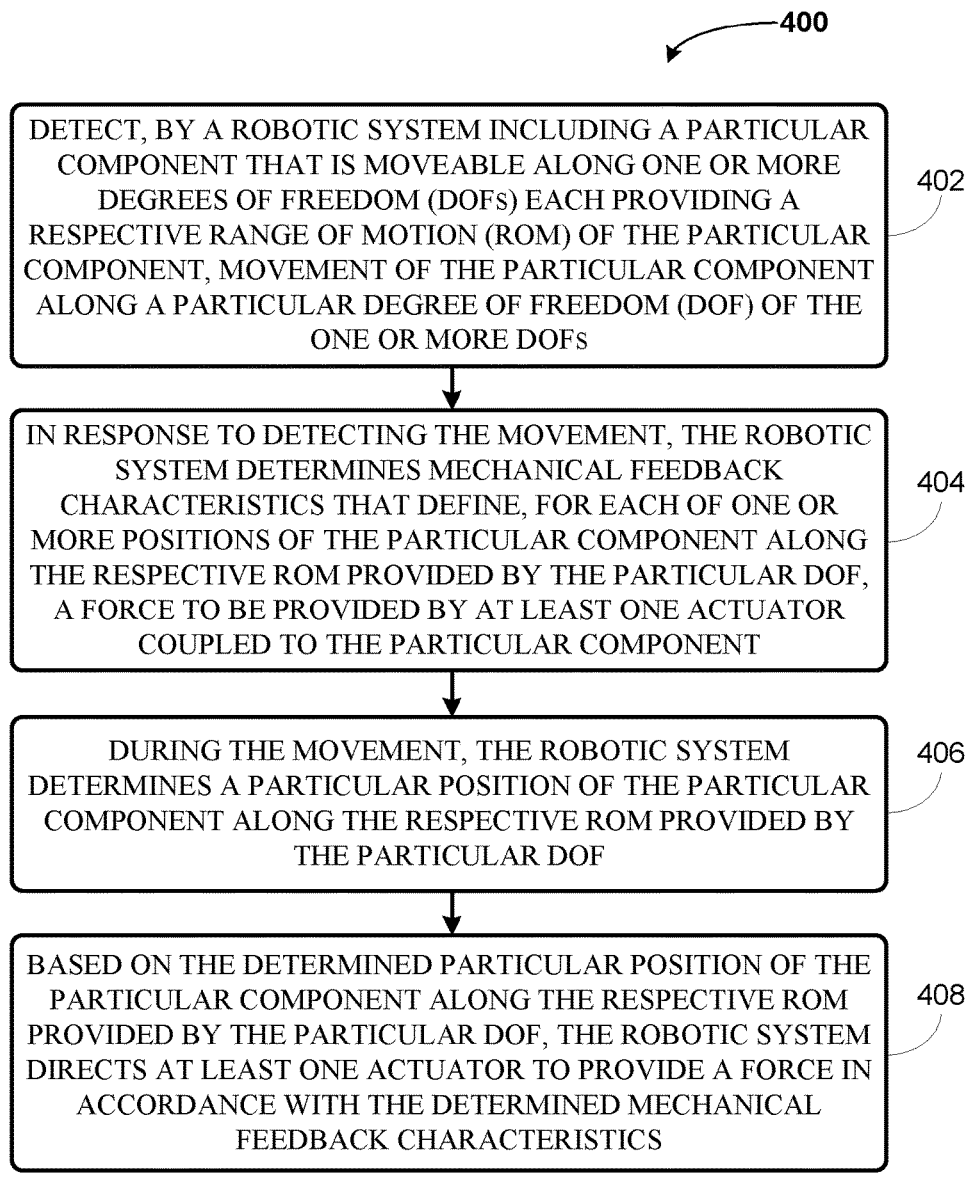
FIG. 4 is an example flowchart for providing feedback, according to an example implementation.

FIG. 4 is a flowchart illustrating a method 400, according to an example implementation. Illustrative methods, such as method 400, may be carried out in whole or in part by a component or components in a robotic system, such as by the one or more of the components of the robotic system 100 shown in FIG. 1 or the robotic arm 200 shown in FIG. 2. However, it should be understood that example methods, such as method 400, may be carried out by other entities or combinations of entities (e.g., by other devices and/or combinations of devices), without departing from the scope of the disclosure.

It should be understood that for this and other processes and methods disclosed herein, flowcharts show functionality and operation of one possible implementation of present implementations. In this regard, each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

As shown by block 402, method 400 involves detecting, by a robotic system including a particular component that is moveable along one or more degrees of freedom (DOFs) each providing a respective range of motion (ROM) of the particular component, movement of the particular component along a particular degree of freedom (DOF) of the one or more DOFs.

Figure 5:
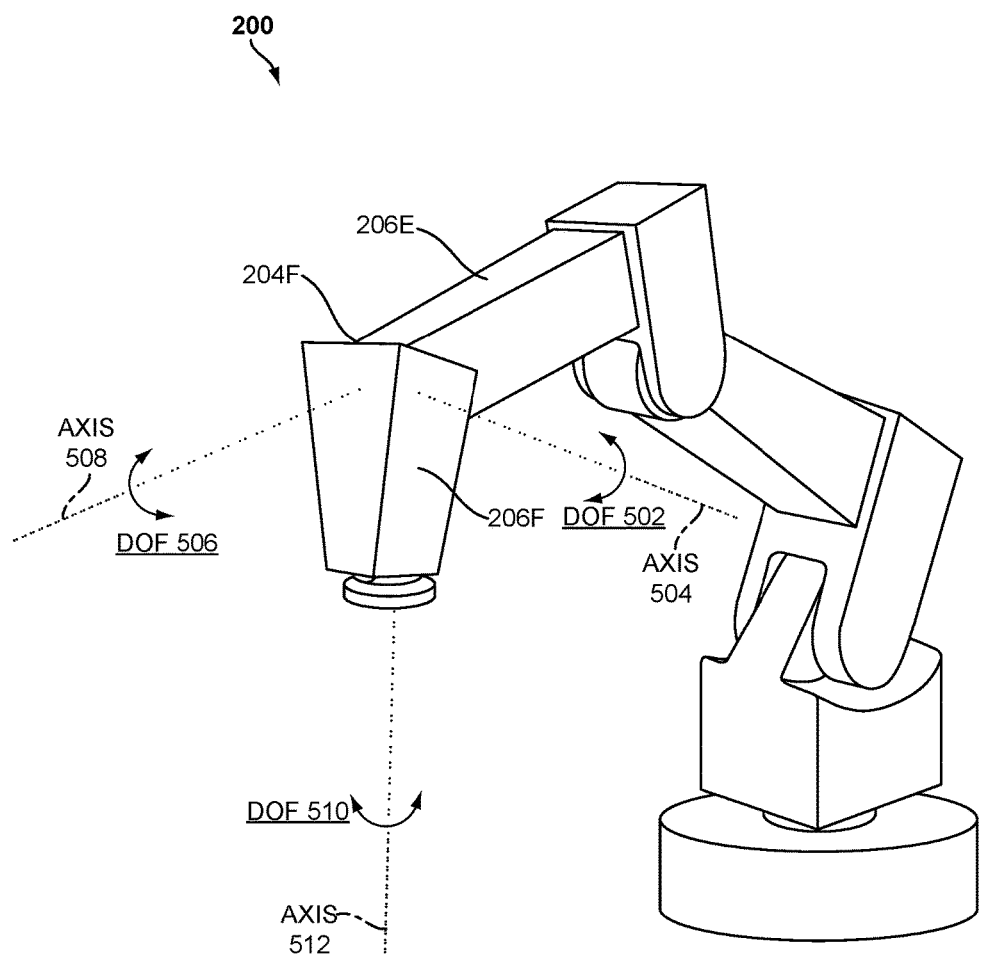
FIG. 5 illustrates DOFs of an appendage of the robotic arm, according to an example implementation.

In an example implementation, at least one particular moveable component (e.g., a moveable component 116) may be moveable along one or more DOFs. In practice, a certain DOF could define translation of the particular component along a certain axis in physical space or could define rotation of the particular component about a certain axis in physical space. For example, FIG. 5 illustrates three of the DOFs of appendage 206F. As shown, the appendage 206 may be arranged to move along DOFs 502, 506, and 510. In particular, movement along DOF 502 may involve rotation of appendage 206F about axis 504 of joint 204F, movement along DOF 506 may involve rotation of appendage 206F about axis 508 of joint 204F, and movement along DOF 510 may involve rotation of appendage 206F about axis 512 of joint 204F. Other illustrations are possible as well.

Furthermore, each DOF of the particular component may provide a respective ROM of the particular component. In practice, an ROM may define a linear or angular distance that the particular component may typically travel along a certain DOF while properly attached to another component. Also, each ROM may have at least one ROM limit beyond which the particular component is incapable of moving without potentially causing damage to the robotic system 100. Moreover, when the particular component moves through a respective ROM along a certain DOF, the particular component could move in a first direction or may move in a second direction that is opposite to the first direction. In this manner, the particular component may move through various positions along a respective ROM and these positions may be defined in various ways. For instance, positions along a respective ROM may be defined as a distance (e.g., an angular distance or a linear distance) away from an ROM limit and/or a distance towards an ROM limit, among other possibilities.

Figure 6A:
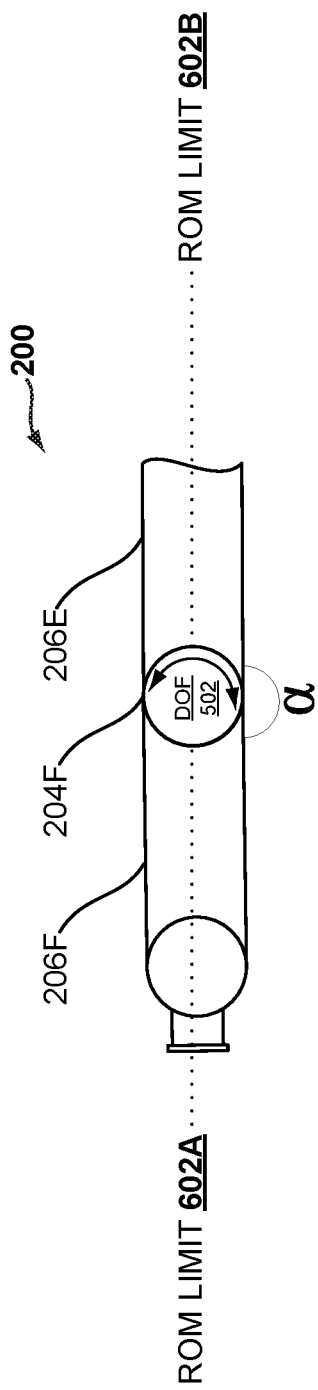
FIGS. 6A to 6E collectively illustrate example positions of the appendage along a respective ROM provided by one of the DOFs, according to an example implementation.
Figure 6B:
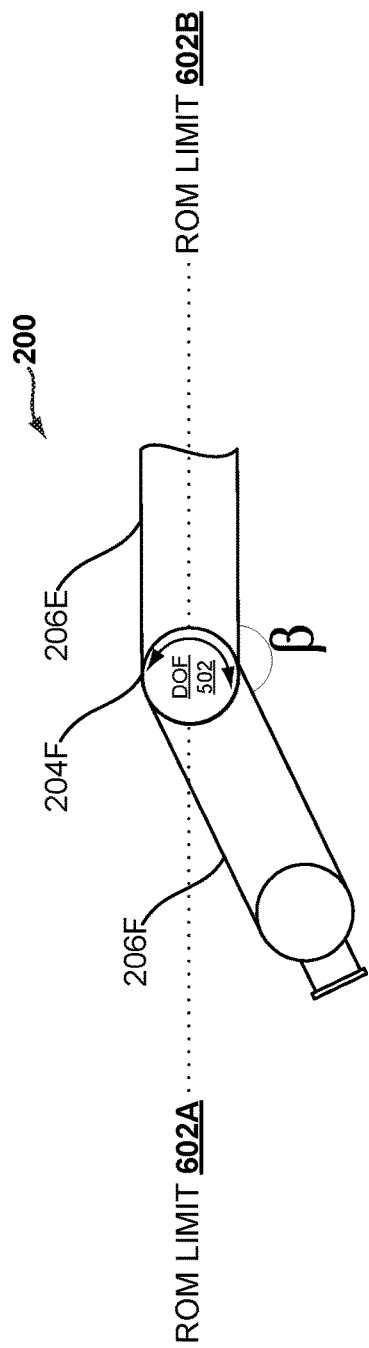
Figure 6C:
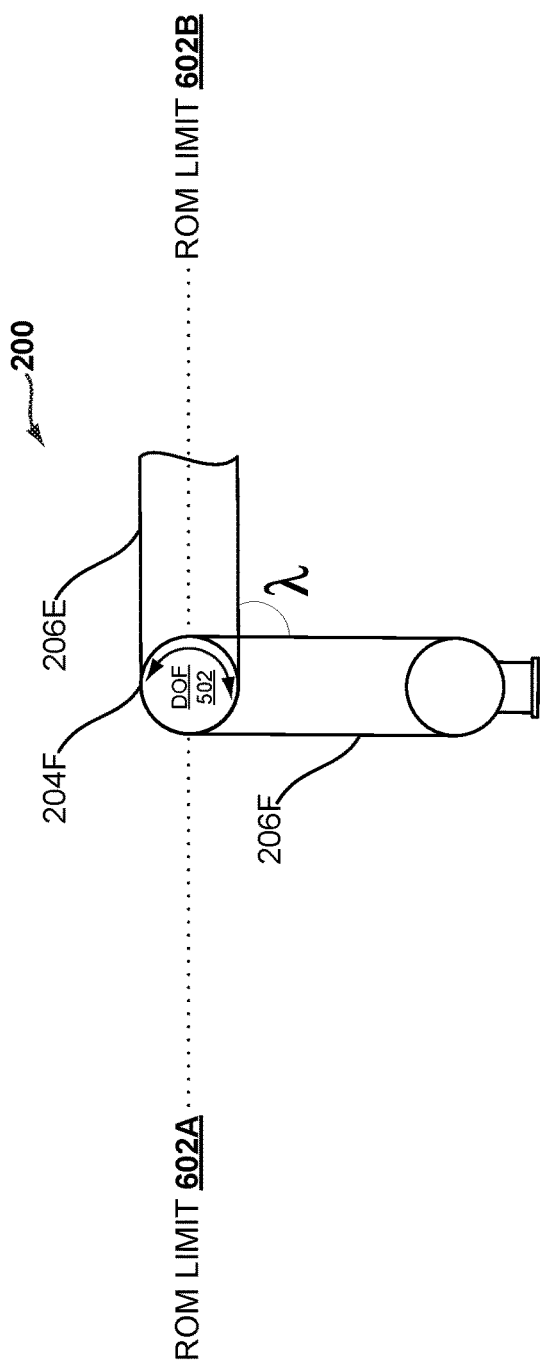
Figure 6D:
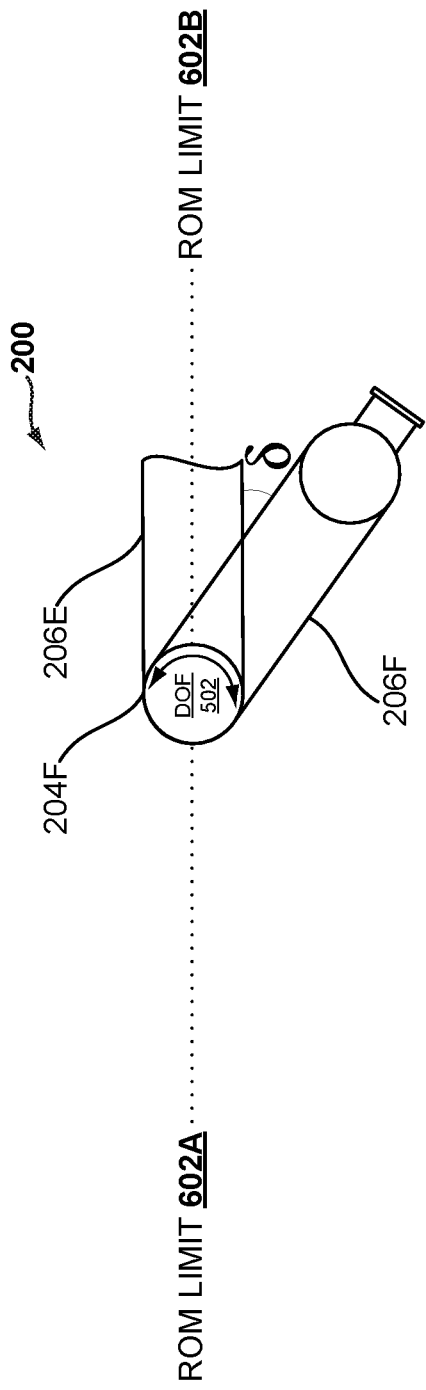
Figure 6E:
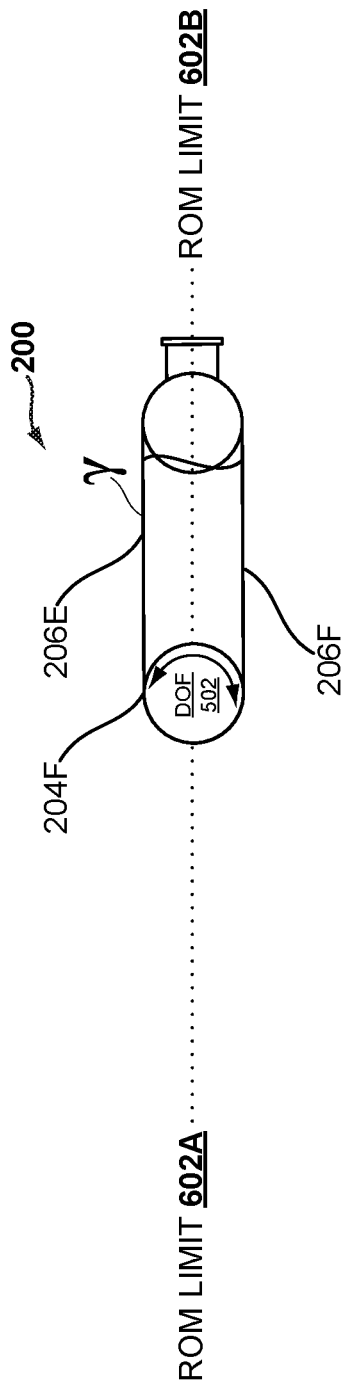

FIGS. 6A to 6E show a side view of a portion of robotic arm 200 and collectively illustrate example positions of appendage 206F along a respective ROM provided by DOF 502. As shown, the respective ROM provided by DOF 502 has ROM limits 602A and 602B. Also, as shown in FIG. 6A, the appendage 206F is positioned at ROM limit 602A, which is at an angular distance α away from ROM limit 602B. Additionally, as shown in FIG. 6B, the appendage 206F is positioned at an angular distance β away from ROM limit 602B. Further, as shown in FIG. 6C, the appendage 206F is positioned at an angular distance λ away from ROM limit 602B. Yet further, as shown in FIG. 6D, the appendage 206F is positioned at an angular distance δ away from ROM limit 602B. Yet further, as shown in FIG. 6E, the appendage 206F is positioned at an angular distance γ away from ROM limit 602B, which corresponds to the appendage 206F being positioned at ROM limit 602B. Other positions along the respective ROM provide by DOF 502 are possible as well.

Figure 7A:
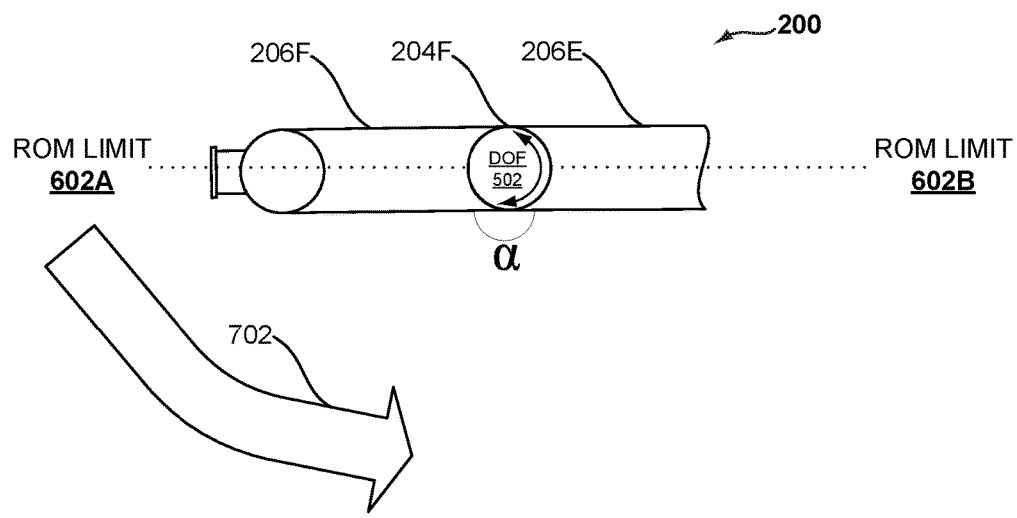
FIGS. 7A to 7B illustrate example directions of movement of the appendage along the respective ROM, according to an example implementation.
Figure 7B:
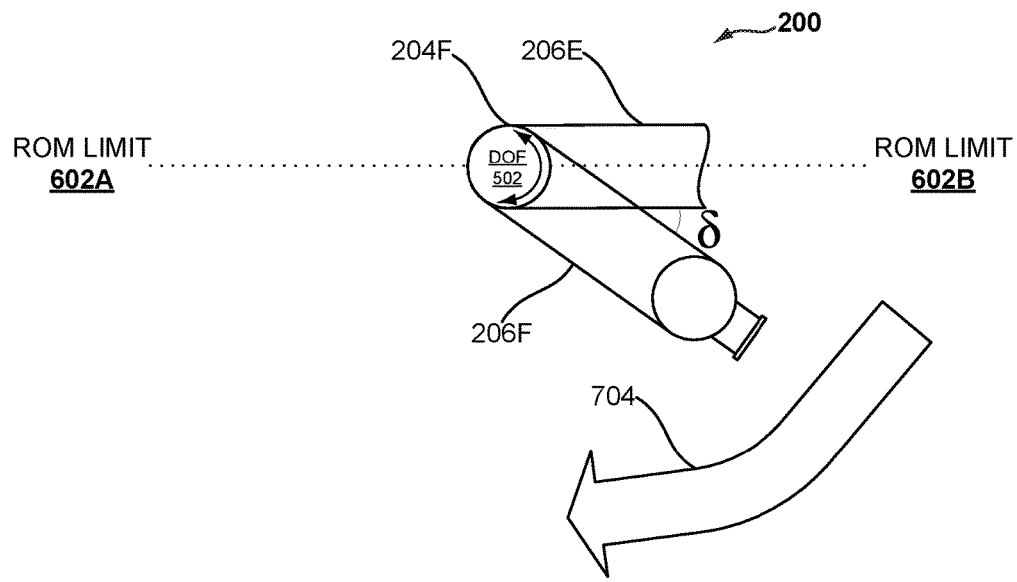

FIGS. 7A to 7B illustrate example directions of movement of appendage 206F along the respective ROM provided by DOF 502. As shown in FIG. 7A, the appendage 206F can move in a direction 702 towards ROM limit 602B. In doing so, the appendage 206F may start at any position (e.g., angular distance α) and then move (e.g., as a result of an external force applied by a user) through one or more positions in a direction 702 towards ROM limit 602B. And as shown in FIG. 7B, the appendage 206F can also move in an opposite direction 704 towards ROM limit 602A. In doing so, the appendage 206F may start at any position (e.g., angular distance δ) and then move (e.g., as a result of an external force applied by a user) through one or more positions in a direction 704 towards ROM limit 602A. Other illustrations are also possible.

In accordance with the disclosure, the robotic system 100 may detect movement of the particular component along a particular DOF and may do so in one of various ways. For example, the robotic system 100 may have included thereon one or more encoders (e.g., encoder(s) 118) each configured to provide information related to position of the particular component along an ROM provided by a respective DOF, such as by providing an angular position and/or a linear position for instance. With this arrangement, the robotic system 100 may be configured to detect when a certain one of the encoders provides information indicative of change of position of the particular component along an ROM provided by a respective DOF. So if the robotic system 100 detects that a particular encoder associated with the particular DOF provides information indicative of change of position of the particular component along the respective ROM provided by the particular DOF, then the robotic system 100 may responsively detect movement of the particular component along the particular DOF. Other examples are possible as well.

Moreover, when the robotic system 100 detects movement of the particular component along the particular DOF, the robotic system 100 may determine in one of various ways that the movement results from application of an external force and/or from other forms of user-robot interaction as discussed above. For example, the robotic system 100 may have one or more touch sensors arranged on the particular component and configured to provide touch data. So given these touch sensors, the robotic system 100 may be configured to receive touch data indicative of touch (e.g., by a user) on the particular component. With this arrangement, if the robotic system 100 detects movement of the particular component along the particular DOF and simultaneously receives touch data indicative of touch on the particular component, then the robotic system 100 may determine that the movement results from application of an external force and/or from other forms of user-robot interaction as discussed above.

In another example, the particular component may be coupled to one or more actuators 114 each configured to move the particular component along a respective ROM provide by a respective DOF. With this arrangement, the robotic system 100 may evaluate operation of a given actuator to determine whether and/or how the robotic system 100 is independently moving the particular component along a given DOF. So in one instance, if the robotic system 100 detects movement of the particular component along the particular DOF while also determining that a respective actuator is not being simultaneously instructed to move the particular component along the particular DOF, then the robotic system 100 may determine that the movement results from application of an external force and/or from other forms of user-robot interaction as discussed above. And in another instance, if the robotic system 100 detects movement of the particular component along the particular DOF with certain movement characteristics (e.g., velocity, acceleration, target positions etc.) while also determining that a respective actuator is being simultaneously instructed to move the particular component along the particular DOF with other movement characteristics, then the robotic system 100 may responsively determine that the movement results from application of an external force and/or from other forms of user-robot interaction as discussed above. Other examples are also possible.

As shown by block 404, method 400 involves, in response to detecting the movement, the robotic system determining mechanical feedback characteristics that define, for each of one or more positions of the particular component along the respective ROM provided by the particular DOF, a force to be provided by at least one actuator coupled to the particular component.

In an example implementation, one or more of the DOFs of the particular component may each respectively have associated mechanical feedback characteristics defining one or more forces (e.g., linear forces and/or torques) that should be applied when the robotic system 100 detects movement of the particular component along a respective DOF, such as movement resulting from application of an external force. Given such mechanical feedback characteristics, the robotic system 100 may encourage certain types of movements of the moveable component(s) 106 while discouraging other types movements of the moveable component(s) 106.

With this arrangement, certain DOF(s) could have respective mechanical feedback characteristics that are the same as mechanical feedback characteristics of other DOF(s), certain DOF(s) could have respective mechanical feedback characteristics that are different from mechanical feedback characteristics of other DOF(s), and/or certain DOF(s) may not have associated mechanical feedback characteristics. In this manner, the present disclosure may be carried out in the context of movement along any of the DOFs of the particular component and thus in the context of any of the respective mechanical feedback characteristics that are associated with such DOFs. For simplicity, however, the present disclosure is discussed below in the context of mechanical feedback characteristics that are associated with the above-mentioned particular DOF.

More specifically, each position of the particular component along the respective ROM provided by the particular DOF may have a corresponding force that is set to be applied, such as by an actuator coupled to the particular component for instance. So for some positions, the forces set to be applied may be relatively high and, for other positions, the forces set to be applied may be relatively low and, for yet other position, the forces set to be applied may be zero forces (i.e., no force to be applied). As an example, the mechanical feedback characteristics may be arranged so that higher forces are set to be applied when the particular component approaches an ROM limit. For instance, a first force may be set to be applied when the particular component is at a first distance (e.g., angular distance) away from a given ROM limit and a second force may be set to be applied when the particular component is at a second distance away from the same given ROM limit. So in this instance, if the first distance is smaller than the second distance (e.g., the first distance is closer to the ROM limit), then the first force may be larger than the second force.

Moreover, the particular DOF may have first associated mechanical feedback characteristics that are used for instances in which the particular component moves in a first direction along the respective ROM provided by the particular DOF and may have second associated mechanical feedback characteristics that are used for instances in which the particular component moves in a second direction (e.g., opposite to the first direction) along the respective ROM provided by the particular DOF. These first and second associated mechanical feedback characteristics may be the same as one another (e.g., same set of forces as one another) or may be different from one another (e.g., different sets of forces compared to one another). For example, forces of the first mechanical feedback characteristics may be set so as to counteract movement of the particular component in the first direction, such as with forces proportionally increasing as the particular component approaches a first ROM limit for instance. Whereas, forces of the second mechanical feedback characteristics may be set so as to counteract movement of the particular component in the second direction, such as with forces proportionally increasing as the particular component approaches a second ROM limit for instance.

With this arrangement, the robotic system may be set to determine a direction of movement of the particular component along the particular DOF (e.g., by evaluating a sequence of positions of the particular component) and then responsively refer to the associate mechanical feedback characteristics. In particular, if the robotic system determines that that particular component is moving in the above-mentioned first direction, then the robotic system may responsively refer to the above-mentioned first associated mechanical feedback characteristics. Whereas, if the robotic system determines that that particular component is moving in the above-mentioned second direction, then the robotic system 100 may responsively refer to the above-mentioned second associated mechanical feedback characteristics.

Given the above arrangements, the robotic system may, for example, apply forces in an attempt to discourage a user from moving the particular component close to (or perhaps beyond) an ROM limit. And in doing so, the robotic system could, for example, apply forces in an attempt to encourage the user to move the particular component towards a certain position, such as substantially towards a center of a respective ROM (e.g., being positioned at a substantially equal distance away from each respective ROM limit). Moreover, if the user nonetheless attempts to move the particular component close to (or perhaps beyond) an ROM limit, the robotic system may be set to apply forces to counteract such movements and perhaps to move the particular component back towards the above-mentioned center position. In this manner, the mechanical feedback characteristics may potentially help with avoiding damage to the robotic system.

In order to refer to mechanical feedback characteristics, the robotic system 100 may refer mapping data representative of mechanical feedback characteristics, which may be stored on the data storage 104 and/or may be otherwise accessible to the robotic system 100 in other ways. In particular, the mapping data may map each respective position of the particular component to a force to be applied when the particular component is at the respective position. In doing so, the mapping data may also specify a direction in which the force should be applied (e.g., to counteract movement of the particular component in a certain direction). And in some implementations, the mapping data may also specify at least one actuator with which to apply a certain force.

Moreover, each direction of movement along a respective DOF may have such associated mapping data. So with this arrangement, the robotic system 100 may be set to determine which mapping data to refer to and may do so based on the DOF along which the particular component is moving and perhaps based on the direction of movement along that DOF. And once the robotic system 100 determine the mapping data to refer to, the robotic system 100 may then refer to the determined mapping data so as to determine which forces to apply.

FIG. 8A illustrates mechanical feedback characteristics 802 associated with movement of appendage 206F along DOF 502 in direction 702. As shown, when appendage 206F is moving in direction 702 and is positioned at an angular distance α away from ROM limit 602B, then at least one actuator 114 in joint 204F may be set to responsively apply a torque of 0 (zero) newton-meter (N·m) and thus a zero force. Also, when appendage 206F is moving in direction 702 and is positioned at an angular distance β away from ROM limit 602B, then at least one actuator 114 in joint 204F may be set to responsively apply a torque of 1 (one) N·m. Additionally, when appendage 206F is moving in direction 702 and is positioned at an angular distance λ away from ROM limit 602B, then at least one actuator 114 in joint 204F may be set to responsively apply a torque of 4 (four) N·m. Further, when appendage 206F is moving in direction 702 and is positioned at an angular distance δ away from ROM limit 602B, then at least one actuator 114 in joint 204F may be set to responsively apply a torque of 6 (six) N·m. Yet further, when appendage 206F is moving in direction 702 and is positioned at an angular distance γ away from ROM limit 602B (and thus has reach the ROM limit 602B while moving in direction 702), then at least one actuator 114 in joint 204F may be set to responsively apply a torque of 9 (nine) N·m.

FIG. 8B then illustrates mechanical feedback characteristics 804 associated with movement of appendage 206F along DOF 502 in direction 704. As shown, when appendage 206F is moving in direction 704 and is positioned at an angular distance γ away from ROM limit 602B, then at least one actuator 114 in joint 204F may be set to responsively apply a torque of 2 (two) N·m. Also, when appendage 206F is moving in direction 704 and is positioned at an angular distance δ away from ROM limit 602B, then at least one actuator 114 in joint 204F may be set to responsively apply a torque of 4 (four) N·m. Additionally, when appendage 206F is moving in direction 704 and is positioned at an angular distance λ away from ROM limit 602B, then at least one actuator 114 in joint 204F may be set to responsively apply a torque of 5 (five) N·m. Further, when appendage 206F is moving in direction 704 and is positioned at an angular distance β away from ROM limit 602B, then at least one actuator 114 in joint 204F may be set to responsively apply a torque of 8 (eight) N·m. Yet further, when appendage 206F is moving in direction 704 and is positioned at an angular distance α away from ROM limit 602B (and thus has reach the ROM limit 602A while moving in direction 704), then at least one actuator 114 in joint 204F may be set to responsively apply a torque of 10 (ten) N·m. Other illustrations are possible as well.

Referring back to FIG. 4, as shown by block 406, method 400 involves, during the movement, the robotic system determining a particular position of the particular component along the respective ROM provided by the particular DOF. And as shown by block 408, method 400 involves, based on the determined particular position of the particular component along the respective ROM provided by the particular DOF, the robotic system directing at least one actuator to provide a force in accordance with the determined mechanical feedback characteristics.

Once the robotic system 100 has determined the appropriate mechanical feedback characteristics as discussed above, the robotic system 100 may be set to monitor the position of the particular component along the respective ROM provided by the particular DOF. More specifically, as the particular component moves along the particular DOF (e.g., as a result of external forces), the robotic system 100 may make a determination that the particular component is at a certain first position (e.g., based on position data received from an encoder). Once the robotic system 100 makes this determination, then the robotic system 100 may refer to the mapping data to determine a certain first force that should be applied and perhaps a select actuator with which to apply the first force. And the robotic system may then responsively direct the actuator to apply the first force in accordance with the mechanical feedback characteristics.

At a later point in time, as the particular component continues to move along the particular DOF (e.g., as a result of further external forces), the robotic system 100 may make a further determination that the particular component is at a certain second position (e.g., based on further position data received from an encoder). Once the robotic system 100 makes this further determination, then the robotic system 100 may again refer to the mapping data to determine a certain second force that should be applied and perhaps a select actuator with which to apply the second force (e.g., same as the above-mentioned select actuator). And the robotic system may then responsively direct the actuator to apply the second force in accordance with the mechanical feedback characteristics.

By way of example, the robotic arm 200 may be set to monitor the position of the appendage 206F along the DOF 502 as the appendage 206F moves in direction 702. In doing so, the robotic arm 200 may refer to the mechanical feedback characteristics 802. More specifically, as the appendage 206F moves along the DOF 502 in direction 702, the robotic arm 200 may make a determination that the appendage 206F is positioned at an angular distance λ away from ROM limit 602B. In response to making this determination, the robotic system 100 may refer to the mechanical feedback characteristics 802 to determine that 4 N·m should be applied to counteract movement of the appendage 206F in direction 702. And the robotic system may then responsively direct at least one actuator in joint 204F to apply 4 N·m in accordance with the mechanical feedback characteristics 802.

At a later point in time, as the appendage 206F continues to move along the DOF 502 in direction 702, the robotic arm 200 may make a further determination that the appendage 206F is positioned at an angular distance δ away from ROM limit 602B. In response to making this further determination, the robotic system 100 may again refer to the mechanical feedback characteristics 802 to determine that 6 N·m should be applied to further counteract movement of the appendage 206F in direction 702. And the robotic system may then responsively direct at least one actuator in joint 204F to apply 6 N·m in accordance with the mechanical feedback characteristics 802. Other examples are also possible.

When the robotic system 100 applies a certain force as the particular component is at a certain position, the robotic system 100 may apply this force for one of various durations. For example, the robotic system 100 may be set to apply this force for a predetermined duration, which could be specified in the mapping data representative of the mechanical feedback characteristics being referred to. And in another example, the robotic system 100 may be set to apply this force as long as the robotic system 100 continues to detect application of an external force and/or application of other forms of user-robot interaction as discussed above. Other examples are also possible.

With this arrangement, the robotic system 100 may apply various forces as the particular component moves in a first direction along the particular DOF. If the robotic system 100 detects that the particular component has changed direction movement along the particular DOF from the first direction to a second direction (e.g., opposite to the first direction), then the robotic system may responsively stop referring to first mechanical feedback characteristics associated with the first direction and may begin referring to second mechanical feedback characteristics associated with the second direction, so as to ultimately apply forces in accordance with the second mechanical feedback characteristics as the particular component moves in the second direction.

Moreover, if the robotic system 100 detects that the particular component has changed the DOF along which the particular component is moving, such as from movement along the particular DOF to movement along a different DOF, then the robotic system may responsively stop referring to mechanical feedback characteristics associated with the particular DOF and may begin referring to different mechanical feedback characteristics associated with the different DOF, so as to ultimately apply forces in accordance with the different mechanical feedback characteristics as the particular component moves along the different DOF. Other considerations are possible as well.

In a further aspect, any given mechanical feedback characteristics may be adjustable, so as to result in a change in the manner in which the robotic system 100 encourages certain types of movement and/or discourages other types of movement. In particular, the robotic system 100 may determine feedback adjustment data indicative of an adjustment to a given mechanical feedback characteristics. In one case, the robotic system 100 may determine this feedback adjustment data by receiving user-input data indicative of the adjustment. In practice, the robotic system 100 may receive such user-input data in various ways. For instance, the robotic system 100 may be in communication with a computing device having a display that displays a graphical user interface (GUI) on which a user may specify an adjustment to mechanical feedback characteristics, thereby allowing the robotic system 100 to receive the feedback adjustment data from the computing device once the user has specified an adjustment. Other instances are also possible.

In another case, the robotic system 100 may determine this feedback adjustment data in response to a change in operating mode of the robotic system 100. This may specifically involve determining a change from operating in a first mode to operating in a second mode that is different from the first mode. And in some situations, the change may be responsive to the robotic system 100 detecting a particular event in the environment. To do so, the robotic system 100 may receive sensor data from one or more sensor(s) 110 and may determine that the sensor data is indicative of the particular event. In other situations, the change may be part of internal operations of the robotic system 100 and thus may not necessarily be responsive to detecting an event. Other situations are possible as well.

As such, the robotic system 100 may determine feedback adjustment data in response to determining the change. For instance, determining the feedback adjustment data may involve the robotic system 100 transitioning from referring to first mechanical feedback characteristics associated with the first mode to referring to second mechanical feedback characteristics associated with the second mode. In this instance, the adjustment thus involves an adjustment from applying the forces specified in the first mechanical feedback characteristics to applying the forces specified in the second mechanical feedback characteristics. Alternatively, determining the feedback adjustment data may involve the robotic system 100 referring mapping data that maps the particular change to one or more predetermined adjustments. So the robotic system 100 may determine the one or more predetermined adjustments and may then apply these adjustments to the first mechanical feedback characteristics. Other instances are possible as well.

By way of example, operation in the first mode may involve operation of the robotic system 100 when the robotic system 100 has not encountered any obstacles in the vicinity (e.g., positioned within a threshold distance) of the robotic system 100, thereby carrying out operations without consideration of obstacles in the environment. Whereas, operation in the second mode may involve operation of the robotic system 100 when the robotic system 100 has encountered one or more obstacles in the vicinity of the robotic system 100, thereby carrying out operations while considering the presence of obstacles in the environment. In this example, the robotic system 100 may encounter an obstacle in the environment and may responsively carry out a change from operating in the first mode to operating in the second mode. And in response to the change, the robotic system 100 may begin referring to the second mechanical feedback characteristics, which may specify relatively higher forces compared to force specified in the first mechanical feedback characteristics. In this manner, the second mechanical feedback characteristics may result in higher resistance to movement of the particular component, which may help avoid a collision between the particular component and the obstacle in the environment. Other examples and cases are possible as well.

In either case, an adjustment to mechanical feedback characteristics may involve a change to at least one force value specified in the mechanical feedback characteristics. In particular, given mechanical feedback characteristics may define a first force that is to be provided when the particular component is at a given position. And when an adjustment takes place, the robotic system 100 may change the specified force to a second force (e.g., different than the first force) that is to be provided when the particular component is at the given position.

Figure 9A:
FIGS. 9A to 9B illustrate adjusted mechanical feedback characteristics, according to an example implementation.

FIG. 9A illustrates an adjustment to mechanical feedback characteristics 802 to result in adjusted mechanical feedback characteristics 902. As shown, the adjustment involves a change from (i) having at least one actuator 114 in joint 204F be set to apply a torque of 0 N·m when appendage 206F is moving in direction 702 and is positioned at an angular distance $\alpha$ away from ROM limit 602B to (ii) having at least one actuator 114 in joint 204F be set to apply a torque of 1 N·m when appendage 206F is moving in direction 702 and is positioned at an angular distance $\alpha$ away from ROM limit 602B. In this manner, the robotic system 100 may be set to apply forces throughout a wider range of the respective ROM of DOF 502, which may provide an earlier indication to a user of movement of the appendage 206F towards ROM limit 602B.

Figure 9B:

FIG. 9B illustrates an adjustment to mechanical feedback characteristics 804 to result in adjusted mechanical feedback characteristics 904. As shown, the adjustment involves a change from (i) having at least one actuator 114 in joint 204F be set to apply a torque of 10 N·m when appendage 206F is moving in direction 704 and is positioned at the ROM limit 602A (e.g., at an angular distance $\alpha$ away from ROM limit 602B) to (ii) having at least one actuator 114 in joint 204F be set to apply a torque of 12 N·m when appendage 206F is moving in direction 704 and is positioned at the ROM limit 602A. In this manner, the robotic system 100 may be set to apply a higher force when the particular component reaches ROM limit 602A, which may further discourage a user from moving the appendage 206F beyond ROM limit 602A. Other illustrations are possible as well.

After mechanical feedback characteristics are adjusted, the robotic system 100 may be set to carry out the various aspects of method 400 and do so in the context of the adjusted mechanical feedback characteristics. In particular, at a later point in time, the robotic system 100 may detect further movement of the particular component (e.g., resulting from an external force) along the above-mentioned particular DOF and may responsively determine the adjusted mechanical feedback characteristics associated with particular DOF. Also, as the further movement is carried out, the robotic system 100 may determine a particular position of the particular component along the respective ROM provided by the particular DOF. And based on the particular position, the robotic system 100 may direct at least one actuator to apply a certain force in accordance with the adjusted mechanical feedback characteristics.

In yet a further aspect, the robotic system 100 may be set to apply forces at times that follow a determination that an external force and/or other forms of user-robot interaction are no longer being applied. These forces may be specified in mechanical damping characteristics and the mechanical damping characteristics may be arranged in various ways. For example, the mechanical damping characteristics may be set so that a series of forces is applied to get the particular component to a certain predetermined position. And in another example, the mechanical damping characteristics may be set so that the particular component exhibits characteristics of an oscillating spring having certain damping factors. Other examples are possible as well.

More specifically, the robotic system 100 may determine in various ways that an external force and/or other forms of user-robot interaction are no longer being applied. For example, the robotic system 100 touch data indicating that there is no longer touch (e.g., by a user) on the particular component and may responsively determine that an external force is no longer being applied. In another example, the robotic system 100 may determine that the robotic system 100 is no longer receiving commands from a remote controller and may responsively determine that an external force is no longer being applied. Other examples are also possible.

Once the robotic system 100 determines that an external force and/or other forms of user-robot interaction are no longer being applied, the robotic system 100 may responsively determine mechanical damping characteristics associated with the particular DOF. In particular, the mechanical damping characteristics may specify that each position of the particular component along the respective ROM provided by the particular DOF may have a corresponding force that is set to be applied, such as by an actuator coupled to the particular component for instance. So the robotic system 100 may be arranged to determine an ensuing position of the particular component at a time when the robotic system 100 determines that an external force and/or other forms of user-robot interaction are no longer being applied. And based on this ensuing position, the robotic system 100 may be set to refer to the mechanical damping characteristics so as to determine one or more forces corresponding to this ensuing position and then direct at least one actuator to provide these forces in accordance with the mechanical damping characteristics.

With regards to mechanical damping characteristics, the particular DOF may have first associated mechanical damping characteristics that are used for instances in which (or after) the particular component moves in a first direction along the respective ROM provided by the particular DOF and may have second associated mechanical damping characteristics that are used for instances in which (or after) the particular component moves in a second direction (e.g., opposite to the first direction) along the respective ROM provided by the particular DOF. Furthermore, certain DOF(s) could have respective mechanical damping characteristics that are the same as mechanical damping characteristics of other DOF(s), certain DOF(s) could have respective mechanical damping characteristics that are different from mechanical damping characteristics of other DOF(s), and/or certain DOF(s) may not have associated mechanical damping characteristics.

Moreover, in order to refer to mechanical damping characteristics, the robotic system 100 may refer mapping data representative of mechanical damping characteristics, which may be stored on the data storage 104 and/or may be otherwise accessible to the robotic system 100 in other ways. This mapping data may map respective positions of the particular component to one or more forces to be provided. Additionally or alternatively, the mapping data may specify for each position: at least one actuator to use for applying force(s), a direction in which certain forces should be applied, and/or durations for which forces should be applied, among other possibilities.

Figure 10:
FIG. 10 illustrates mechanical damping characteristics, according to an example implementation.

FIG. 10 illustrates mechanical damping characteristics 1002 associated with ensuing positions of the appendage 206F after movement of the appendage 206F along DOF 502 in direction 702. As shown, when appendage 206F is positioned an ensuing position that is at an angular distance α away from ROM limit 602B, then at least one actuator 114 in joint 204F may be set to responsively apply a torque of 3 N·m followed by applied of a torque of 2 N·m. The application of these multiple torques may be set so as to move the appendage 206 from being at the angular distance α away from ROM limit 602B to be at an angular distance λ away from ROM limit 602B. Also, when appendage 206F is positioned an ensuing position that is at an angular distance β away from ROM limit 602B, then at least one actuator 114 in joint 204F may be set to responsively apply a torque of 1 N·m. The application of this torque may be set so as to move the appendage 206 from being at the angular distance β away from ROM limit 602B to be at the angular distance λ away from ROM limit 602B.

Additionally, when appendage 206F is positioned an ensuing position that is already at the angular distance λ away from ROM limit 602B, then at least one actuator 114 in joint 204F may be set to responsively not apply any torque (i.e., a torque of 0 N·m). This may be the case so that the appendage 206F remains at the angular distance λ away from ROM limit 602B. Further, when appendage 206F is positioned an ensuing position that is at an angular distance δ away from ROM limit 602B, then at least one actuator 114 in joint 204F may be set to responsively apply a torque of −1 N·m (i.e., a torque that is in the opposite direction of the above-mentioned torque of 1 N·m). The application of this torque may be set so as to move the appendage 206 from being at the angular distance δ away from ROM limit 602B to be at the angular distance λ away from ROM limit 602B.

Yet further, when appendage 206F is positioned an ensuing position that is at an angular distance γ away from ROM limit 602B, then at least one actuator 114 in joint 204F may be set to responsively apply a torque of −3 N·m (i.e., a torque that is in the opposite direction of the above-mentioned torque of 3 N·m) followed by applied of a torque of −2 N·m (i.e., a torque that is in the opposite direction of the above-mentioned torque of 2 N·m). The application of these multiple torques may be set so as to move the appendage 206 from being at the angular distance γ away from ROM limit 602B to be at an angular distance λ away from ROM limit 602B. Other illustrations are also possible.

In this aspect, any given mechanical damping characteristics may be adjustable, so as to result in a change in the manner in which the robotic system 100 further moves the particular component at ensuing positions. In particular, the robotic system 100 may determine damping adjustment data indicative of an adjustment to a given mechanical damping characteristics. In one case, the robotic system 100 may determine this damping adjustment data by receiving user-input data indicative of the adjustment. In practice, the robotic system 100 may receive user-input data in various ways, such as those discussed above. And in another case, the robotic system 100 may determine this damping adjustment data in response to a transition in operating mode of the robotic system 100. This may specifically involve determining a transition from operating in a first mode to operating in a second mode that is different from the first mode, which may involve considerations and operations such as those discussed above in the context of adjustments to mechanical feedback characteristics. Other cases are also possible.

In either case, an adjustment to mechanical damping characteristics may involve a change to at least one force value specified in the mechanical damping characteristics. In particular, given mechanical damping characteristics may define a first series of force(s) that are to be provided when the particular component ends up at a given ensuing position. And when an adjustment takes place, the robotic system 100 may change the specified series of force(s) to a second series force(s) (e.g., different than the first series of force(s)) that are to be provided when the particular component ends up at the given ensuing position. This change may specifically involve a change to one or more of (but not necessarily all) the force values denoted by the first series of force(s).

Figure 11:
FIG. 11 illustrates adjusted mechanical damping characteristics, according to an example implementation.

FIG. 11 illustrates an adjustment to mechanical damping characteristics 1002 to result in adjusted mechanical feedback characteristics 1102. As shown, the adjustment involves a change from (i) having at least one actuator 114 in joint 204F be set to apply a torque of 1 N·m when appendage 206F is moving in direction 702 and is positioned at an angular distance β away from ROM limit 602B to (ii) having at least one actuator 114 in joint 204F be set to apply a torque of 2 N·m when appendage 206F is moving in direction 702 and is positioned at an angular distance β away from ROM limit 602B. In this manner, the robotic system 100 may be set to apply a higher force when the appendage 206F ends up at an ensuing position that is at an angular distance β away from ROM limit 602B, which may speed up movement of the appendage from being positioned at the angular distance β away from ROM limit 602B to being positioned at the angular distance λ away from ROM limit 602B. Other illustrations are also possible After mechanical damping characteristics are adjusted, the robotic system 100 may be set to carry out the present disclosure in the context of the adjusted mechanical damping characteristics. In particular, at a later point in time, the robotic system 100 may detect further movement of the particular component (e.g., resulting from an external force) along the above-mentioned particular DOF following by the particular component ending up at a given ensuing position. Responsively, the robotic system 100 may responsively determine the adjusted mechanical damping characteristics associated with particular DOF. Also, the robotic system 100 may determine the given ensuing position of the particular component along the respective ROM provided by the particular DOF. And based on the given ensuing position, the robotic system 100 may direct at least one actuator to apply a certain series of force(s) in accordance with the adjusted mechanical damping characteristics.

In yet a further aspect, when the movement of the particular component results from instructions provided by a remote controller as discussed above, then feedback may be provided at the controller in addition to or alternatively to feedback provided at the robotic system. For instance, the controller may take the form of a joystick and force(s) could be applied (e.g., by a motor coupled to a stick of the joystick) to counteract movement of the stick in certain directions (e.g., movement resulting from an external force applied by a user to the stick) and/or encourage movement of the stick in other directions. In this regard, such forces may be mapped to the positions of the particular component and/or to positions of the stick. Moreover, the robotic system 100 could instruct the controller to dynamically apply these forces. Alternatively, the controller may be configured to refer to mechanical feedback and/or damping characteristics and then apply forces in accordance with these characteristics. Other aspects are also possible.

V. CONCLUSION

The present disclosure is not to be limited in terms of the particular implementations described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example implementations described herein and in the figures are not meant to be limiting. Other implementations can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The particular arrangements shown in the figures should not be viewed as limiting. It should be understood that other implementations can include more or less of each element shown in a given figure. Further, some of the illustrated elements can be combined or omitted. Yet further, an example implementation can include elements that are not illustrated in the figures.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims.

I claim:

1. A method comprising:
during a movement of a particular component of a robotic system along a particular degree of freedom (DOF), the robotic system determining a particular position of the particular component along a respective range of motion (ROM) of the particular component provided by the particular DOF, wherein the movement results from application of an external force to the robotic system;
based on the particular position, the robotic system directing at least one actuator to provide a particular feedback force in accordance with mechanical feedback characteristics, wherein the mechanical feedback characteristics define, for each of one or more positions of the particular component along the respective ROM provided by the particular DOF, a respective feedback force to be provided by at least one actuator coupled to the particular component;
determining, by the robotic system, an ensuing position of the particular component at a time when the robotic system determines that the external force is no longer being applied to the robotic system; and
based on the ensuing position, the robotic system directing at least one actuator to provide one or more particular damping forces in accordance with mechanical damping characteristics, wherein the mechanical damping characteristics define, for each of one or more positions of the particular component along the respective ROM provided by the particular DOF, one or more respective damping forces to be provided by at least one actuator coupled to the particular component.

2. The method of claim 1,
wherein the respective ROM has at least one respective ROM limit beyond which the particular component is incapable of moving, wherein the mechanical feedback characteristics define a first respective feedback force to be provided when the particular component is at a first position that is at a first distance away from the at least one respective ROM limit of the respective ROM provided by the particular DOF and a second respective feedback force to be provided when the particular component is at a second position that is at a second distance away from the at least one respective ROM limit of the respective ROM provided by the particular DOF, wherein the first distance is smaller than the second distance, and wherein the first respective feedback force is larger than the second respective feedback force.

3. The method of claim 1, wherein, along the particular DOF, the particular component is moveable in a first respective direction and in a second respective direction that is opposite to the first respective direction, the method further comprising:

detecting, by the robotic system, that the movement is in the first respective direction along the particular DOF, wherein the mechanical feedback characteristics further define, for each of one or more positions of the particular component along the respective ROM provided by the particular DOF, a respective feedback force to be provided when the particular component moves in the first respective direction and a respective feedback force to be provided when the particular component moves in the second respective direction, and wherein directing at least one actuator to provide a particular feedback force in accordance with mechanical feedback characteristics is further based on detecting that the movement is in the first respective direction along the particular DOF.

4. The method of claim 3, wherein the respective feedback forces to be provided when the particular component moves in the first respective direction comprise respective feedback forces that counteract the particular component moving in the first respective direction, and wherein the respective feedback forces to be provided when the particular component moves in the second respective direction comprise respective feedback forces that counteract the particular component moving in the second respective direction.

5. The method of claim 1, wherein the mechanical feedback characteristics define, for at least one position of the particular component along the respective ROM provided by the particular DOF, a zero force to be provided by at least one actuator coupled to the particular component.

6. The method of claim 1, further comprising:

determining, by the robotic system, feedback adjustment data indicative of an adjustment to the mechanical feedback characteristics, wherein the adjustment comprises at least a change from (i) defining a first respective feedback force to be provided when the particular component is at a given position along the respective ROM provided by the particular DOF to (ii) defining a second respective feedback force to be provided when the particular component is at the given position along the respective ROM provided by the particular DOF; and based on the determined feedback adjustment data, the robotic system adjusting the mechanical feedback characteristics.

7. The method of claim 6, wherein determining the feedback adjustment data comprises receiving user-input data indicative of the adjustment to the mechanical feedback characteristics.

8. The method of claim 6, further comprising:

determining, by the robotic system, an operational change from the robotic system operating in a first mode to the robotic system operating in a second mode that is different from the first mode, wherein determining the feedback adjustment data indicative of the adjustment to the mechanical feedback characteristics is responsive to determining the operational change from the robotic system operating in a first mode to the robotic system operating in a second mode, and wherein the adjustment to the mechanical feedback characteristics is based on the operational change from operating in the first mode to operating in the second mode.

9. The method of claim 8, further comprising:

receiving, by the robotic system from one or more sensors, sensor data indicative of a particular event in an environment of the robotic system, wherein the operational change from the robotic system operating in a first mode to the robotic system operating in a second mode is responsive to receiving the sensor data indicative of the particular event in the environment of the robotic system.

10. The method of claim 6, further comprising:

after adjusting the mechanical feedback characteristics and during a further movement of the particular component along the particular DOF, the robotic system further determining a particular position of the particular component along the respective ROM provided by the particular DOF; and based on the further determined particular position of the particular component along the respective ROM provided by the particular DOF, the robotic system directing at least one actuator to provide another feedback force in accordance with the adjusted mechanical feedback characteristics.

11. A non-transitory computer readable medium having stored therein instructions executable by one or more processors to cause a robotic system to perform functions comprising:

during a movement of a particular component of the robotic system along a particular degree of freedom (DOF), determining a particular position of the particular component along a respective range of motion (ROM) of the particular component provided by the particular DOF, wherein the movement results from application of an external force to the robotic system;

based on the particular position, directing at least one actuator to provide a particular feedback force in accordance with mechanical feedback characteristics, wherein the mechanical feedback characteristics define, for each of one or more positions of the particular component along the respective ROM provided by the particular DOF, a respective feedback force to be provided by at least one actuator coupled to the particular component;

determining an ensuing position of the particular component at a time when the robotic system determines that the external force is no longer being applied to the robotic system; and based on the ensuing position, directing at least one actuator to provide one or more particular damping forces in accordance with mechanical damping characteristics, wherein the mechanical damping characteristics define, for each of one or more positions of the particular component along the respective ROM provided by the particular DOF, one or more respective damping forces to be provided by at least one actuator coupled to the particular component.

12. The non-transitory computer readable medium of claim 11,
wherein the respective ROM has at least one respective ROM limit beyond which the particular component is incapable of moving,
wherein the mechanical feedback characteristics define a first respective feedback force to be provided when the particular component is at a first position that is at a first distance away from the at least one respective ROM limit of the respective ROM provided by the particular DOF and a second respective feedback force to be provided when the particular component is at a second position that is at a second distance away from the at least one respective ROM limit of the respective ROM provided by the particular DOF,
wherein the first distance is smaller than the second distance, and
wherein the first respective feedback force is larger than the second respective feedback force.

13. The non-transitory computer readable medium of claim 11, the functions further comprising:
determining that the external force resulting in the movement is no longer being applied to the robotic system.

14. The non-transitory computer readable medium of claim 11, the functions further comprising:
determining damping adjustment data indicative of an adjustment to the mechanical damping characteristics, wherein the adjustment comprises at least a change from (i) defining one or more first respective damping forces to be provided when the particular component is at a given position along the respective ROM provided by the particular DOF to (ii) defining one or more second respective damping forces to be provided when the particular component is at the given position along the respective ROM provided by the particular DOF; and
based on the determined damping adjustment data, adjusting the mechanical damping characteristics.

15. The non-transitory computer readable medium of claim 14, wherein determining the damping adjustment data comprises receiving user-input data indicative of the adjustment to the mechanical damping characteristics.

16. The non-transitory computer readable medium of claim 14, the functions further comprising:
determining that the robotic system transitioned from operating in a first mode to operating in a second mode, wherein determining the damping adjustment data indicative of the adjustment to the mechanical damping characteristics is responsive to determining that the robotic system transitioned from operating in the first mode to operating in the second mode, and wherein the adjustment to the mechanical damping characteristics is based on the transition from operating in the first mode to operating in the second mode.

17. The non-transitory computer readable medium of claim 16, the functions further comprising:
receiving, from one or more sensors, sensor data indicative of a particular event in an environment of the robotic system, wherein the transition from operating in the first mode to operating in the second mode is responsive to receiving sensor data indicative of the particular event in the environment of the robotic system.

18. A robotic system comprising:
a particular component;
one or more processors;
a non-transitory computer readable medium; and
program instructions stored on the non-transitory computer readable medium and executable by the one or more processors to:
during a movement of the particular component along a particular degree of freedom (DOF), determine a particular position of the particular component along a respective range of motion (ROM) of the particular component provided by the particular DOF, wherein the movement results from application of an external force to the robotic system;
based on the particular position, direct at least one actuator to provide a particular feedback force in accordance with mechanical feedback characteristics, wherein the mechanical feedback characteristics define, for each of one or more positions of the particular component along the respective ROM provided by the particular DOF, a respective feedback force to be provided by at least one actuator coupled to the particular component;
determine an ensuing position of the particular component at a time when the robotic system determines that the external force is no longer being applied to the robotic system; and
based on the ensuing position, direct at least one actuator to provide one or more particular damping forces in accordance with mechanical damping characteristics, wherein the mechanical damping characteristics define, for each of one or more positions of the particular component along the respective ROM provided by the particular DOF, one or more respective damping forces to be provided by at least one actuator coupled to the particular component.

19. The robotic system of claim 18,
wherein the respective ROM has at least one respective ROM limit beyond which the particular component is incapable of moving,
wherein the mechanical feedback characteristics define a first respective feedback force to be provided when the particular component is at a first position that is at a first distance away from the at least one respective ROM limit of the respective ROM provided by the particular DOF and a second respective feedback force to be provided when the particular component is at a second position that is at a second distance away from the at least one respective ROM limit of the respective ROM provided by the particular DOF,
wherein the first distance is smaller than the second distance, and
wherein the first respective feedback force is larger than the second respective feedback force.

20. The robotic system of claim 18, wherein the particular DOF comprises a first DOF, wherein the particular component is also moveable along a second DOF that is different from the first DOF, wherein the mechanical feedback characteristics comprises first mechanical feedback characteristics that define, for each of one or more positions of the particular component along the respective ROM provided by the first DOF, a respective feedback force to be provided by at least one actuator coupled to the particular component, and wherein the program instructions are further executable to:
- during a further movement of the particular component along the second DOF, further determine a particular position of the particular component along a respective ROM of the particular component provided by the second DOF; and
- based on the further determined particular position of the particular component along the respective ROM provided by the second DOF, direct at least one actuator to provide a further feedback force in accordance with second mechanical feedback characteristics, wherein the second mechanical feedback characteristics define, for each of one or more positions of the particular component along the respective ROM provided by the second DOF, a respective feedback force to be provided by at least one actuator coupled to the particular component.

* * * * *